United States Patent
Dorak

[15] 3,706,506
[45] Dec. 19, 1972

[54] METAL CUTTING MACHINES

[72] Inventor: Marvin H. Dorak, Manitowoc, Wis.

[73] Assignee: Kaufman Mfg. Co., Manitowoc, Wis.

[22] Filed: Dec. 21, 1970

[21] Appl. No.: 100,222

[52] U.S. Cl. ................408/130, 408/131, 408/132, 408/134, 408/137, 408/140, 408/141
[51] Int. Cl. ............................................B23b 47/22
[58] Field of Search......408/130, 132, 134, 137, 140, 408/141, 142, 147, 131; 10/139

[56] References Cited

UNITED STATES PATENTS

| | | | |
|---|---|---|---|
| 3,178,740 | 4/1965 | Dorak | 10/139 |
| 1,005,833 | 10/1911 | Henn | 408/21 |
| 3,411,385 | 11/1968 | Quackenbush | 408/137 |
| 1,967,508 | 7/1934 | Hibbard | 408/137 |
| 2,551,517 | 5/1951 | Webb | 408/8 |

Primary Examiner—Gil Weidenfeld
Attorney—Michael, Best & Friedrich

[57] ABSTRACT

A metal working machine employing expandible and collapsible cutting tools has a motor driven spindle rotating in only one direction. The spindle has axial movement relative to its driving gear. The axial movement is controlled forwardly, first by a fast advance hydraulic system which also adjusts the expandible and/or collapsible cutting tool to its cutting position, and second by a lead screw and solid feed nut which advances the cutting tool as a required rate for at desired purpose. At the end of the cutting movement the hydraulic system expands or collapses the cutting tool, as the case may be, and starts to rapidly withdraw the tool from the workpiece. During this rapid withdrawal, another motor rapidly rotates the lead screw in a direction to unscrew it back to its starting position.

2 Claims, 1 Drawing Figure

PATENTED DEC 19 1972
3,706,506
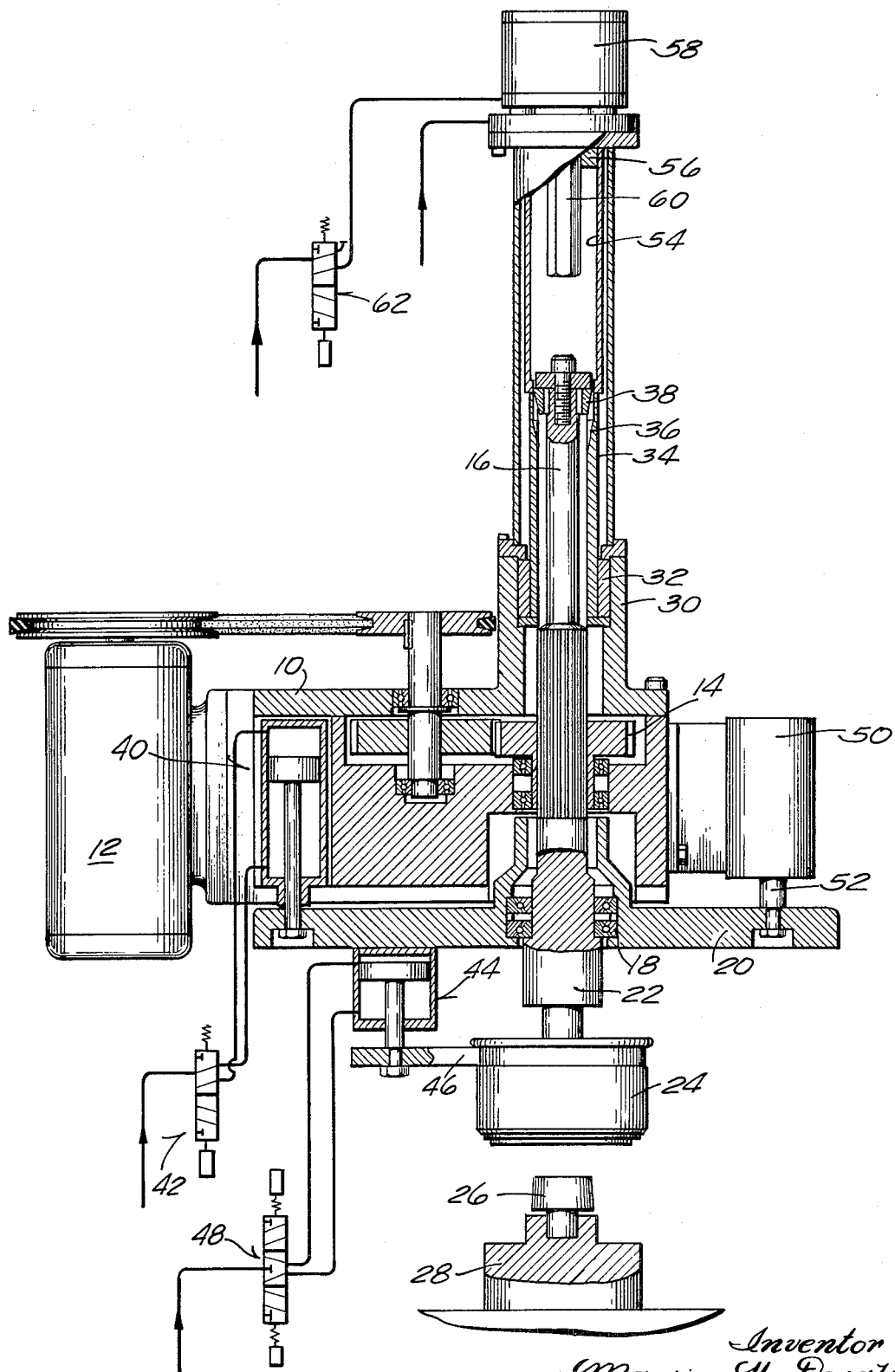
Inventor
Marvin H. Dvorak
By
Gerrit W. Foster
Attorney

METAL CUTTING MACHINES

BACKGROUND OF THE INVENTION

This invention relates generally to metal working machines and more particularly to tapping or screw threading machines in which there is a solid nut and lead screw for controlling the feed of the cutting tool combined with a rapid return of the cutting tool from the end of the cut to starting position without reversing the tool driving motor or disconnecting the engagement between the solid nut and lead screw.

DESCRIPTION OF THE PRIOR ART

A metal working machine of this general type is shown and described in the U.S. Pat. of Marvin H. Dorak No. 3,178,740 issued Apr. 20, 1965. However this machine requires the reversal of the driving motor to retract the lead screw within the solid nut to its relative starting position. Because of this it cannot make efficient use of expandible and/or collapsible cutting tools.

Expandible and collapsible cutting tools are well-known in this field, see the following U.S. Patents: Nos. 1,005,833 1,560,462 2,551,517. However, these patents do not suggest how such tools can be automatically operated in coordination with tool advancing and retracting mechanism and the rapid positioning of a solid nut and lead screw to relative starting position.

The use of a hydraulic system to accomplish rapid advance and retraction is shown in U.S. Pat. No. 1,967,508. An air cylinder has also been used for this purpose, see U.S. Pat. No. 2,551,517. The need of not reversing the tool rotating motor has been eliminated by U.S. Pat. No. 3,411,385 through the use of complicated gearing and ratchet type of feed screw. These systems are all complicated, and expensive to manufacture. Since they also require disconnection of the lead screw and split nut, they are subject to inaccuracy due to wear and to difficult timing of reconnection.

BRIEF DESCRIPTION OF THE DRAWING

The sole FIGURE is a vertical view partly in side plan and partly in section taken on the center line of the machine. Some of the standard components such as solenoid operated hydraulic valves are illustrated diagramatically.

DESCRIPTION OF THE PREFERRED EMBODIMENT

The machine shown in the drawing is, for the purpose of illustrating one embodiment of this invention, a threading machine. However, this invention encompasses other types of metal cutting machines, such as drilling and tapping machines.

The essential features of this invention are: (1) the provision of a hydraulic control carried by the quill to operate the expandible die head or contractible tap in synchronism with the rapid advance and retraction of the quill; and (2) rapid lead screw reversing means to eliminate the necessity of using split type lead screw feed nuts and permit the use of solid lead screw feed nuts which require no adjustment and automatically compensate for lead screw wear.

Referring to the drawing by reference numerals, the threading machine has a frame 10 which mounts an electric drive motor 12. The drive motor is connected by a conventional V-belt drive and a changeable gear train to a spindle driving gear 14. The gear 14 is continuously driven in the same direction when the motor is operating. Such gear is rotatably mounted by bearings which support it against axial displacement in the frame 10.

A spindle 16 is axially slidable within the bore of gear 14 by using well-known splines and grooves which permit such axial movement while transmitting rotational movement. This spindle is rotatably carried in bearings 18 carried by a quill 20. Such bearings are so related to the quill and spindle that relative axial movement therebetween is substantially prevented. Thus axial movement of the quill will transmit axial movement to the spindle with the function hereinafter described. At its lower end, the spindle 16 has a chuck 22 which holds the shank of a conventional expandible die head 24. The workpiece 26 to be threaded is mounted in a well-known manner by a fixture 28 on a base fixed relative to the frame 10.

The frame 10 has an upwardly projection neck 30 provided with a bore for receiving a solid (non-splitable) lead screw feed nut 32. This solid nut is interchangeable with other solid lead screw feed nuts of similar design but with different pitch internal threads. The feed nut, when positioned within the neck 30, is held against rotation. A lead screw 34 has external threads mating with the internal threads of the feed nut. The pitch of the threads of the lead screw and solid feed nut are also matched with the cutting threads of the die head 24. The threads of the solid feed nut are in continuous engagement with the threads of the lead screw. The downward pressure of the lead screw provided by the quill 20 causes the lower surface of its thread to bear continuously on the upper surface of the thread of the feed nut. Thus even with gradual wear these surfaces remain in proper contact without any need for adjustment and provide an accurate, positive lead for precise threading or tapping.

The advancing rotational operation of the lead screw 34 is controlled in the same manner as described in the aforementioned U.S. Pat. No. 3,178,740. The upper end of such lead screw has an internal tapered clutch face 36 and the upper end of the spindle 16 is provided with cone clutch 38 which is designed to engage with clutch face 36 when the quill 20 is urged downwardly carrying with it the spindle 16. The advancing and retraction of the quill 20 is controlled hydraulically as hereinafter described. Advance of the quill will cause engagement of the cone clutch 38 and clutch face 36 at the same time that the die head 24 is brought into cutting contact with workpiece 26. The synchronization between advancing of the quill 20 and the closing of die head 24 is also controlled hydraulically.

Mounted on the frame 10 is a hydraulic cylinder and piston unit indicated generally at 40 which has its piston connected to the quill 20. A conventional solenoid operated hydraulic valve indicated generally at 42, controls pressure from a source to the opposite sides of the piston of unit 40 to advance it within the dimensional limits prescribed by the separated spacing between the clutch faces 36 and 38 plus the axial length of the finished threaded portion on the workpiece and to retract it to the fully withdrawn position shown in the drawing.

A novel feature of this invention is the mounting of another hydraulic cylinder and piston, indicated generally at 44, on the quill 20 so as to move with it. The piston of this hydraulic unit 44 is connected to a yoke 46 which is a part of the conventional expandable die head 24. When the piston is retracted to the position shown in the drawing the cutting members of the die head are moved radially outward so that they will not contact the surface of the workpiece. When the piston is advanced, the yoke 46, moving relative to the shank of the die head, will move the cutting members in the die head radially inwardly to the cutting position designed for such die head. A conventional solenoid operated hydraulic valve, indicated generally at 48, controls pressure from a source to the opposite sides of the piston of unit 44 to move it to and from the retracted position shown in the drawing. This valve 48 can be fixedly mounted on the frame 10 and connected by flexible lines to the hydraulic unit 44 or it may be mounted on the quill 20 and connected by flexible lines to the source of hydraulic pressure.

The synchronization of the operation of the hydraulic units 40 and 44 is obtained by limit switches of conventional design mounted within a control box 50 fixed to the frame 10. Mounted on and movable with the quill 20 is an operating rod 52. The axial movement of this rod will effect in predetermined sequence the energization of the limit switches to control the energization of the solenoids operating the valves 40 and 44.

In the operation of the metal cutting machine shown and described in U.S. Pat. No. 3,178,740 it was necessary for the retraction of the lead screw to maintain the clutch in engagement and reverse the motor. This was slow and time consuming and because of this such machine could not make efficient use of expandable and contractible cutting tools. Hence another feature of this invention is to provide separate means for unscrewing the lead screw 34 back to its retracted position as shown in the drawing. This is accomplished by providing the lead screw 34 with an upper tubular extension 54 at the upper end of which is a plug 56 having a hex-shaped central opening. A fluid motor 58 of conventional design has a hex-shaped driving member 60 which is axially slidable with respect to the plug 56 while transmitting rotational motion to the extension 54 and thence to lead screw 34. The operation of the motor 58 is controlled by a solenoid operated valve unit 62, indicated generally at 62. When energized the motor 58 rapidly unscrews and thus retracts the lead screw to its starting position without maintaining contact between the cone clutch 38 and the clutch face 36. The operation of valve unit 62 is also controlled by a conventional limit switch within the control box 50 when shifted by the operating rod 52.

The parts, as shown in the drawing, are positioned in the retracted position. As soon as the motor 12 is energized: (1) the solenoid of valve unit 48 will also be energized to cause the piston of hydraulic unit 44 to move the yoke 46 downwardly to contact the cutting teeth of die head 24; and (2) the solenoid of valve unit 42 will also be energized to supply pressure to the upper side of the piston of hydraulic unit 40 and exhaust the lower side of such piston. This will cause the quill 20 to be moved downwardly rapidly toward the workpiece until the cone clutch 38 engages the clutch face 36. This engagement stops the downward movement of the quill and consequently that of the spindle. However, downward pressure is still maintained and the spindle will be allowed to advance, while turning, at the rate dependent upon the turning of the lead screw 34 in the solid feed nut 32. This controlled cutting action will continue until the die head 24 reaches an axial length of cut determined by the placement of a limit switch in the control box 50. As the operating rod shifts such limit switch the solenoid of valve unit 48 will be deenergized to cause the piston of hydraulic unit 44 to move the yoke 46 up to its retracted position thus withdrawing the cutting members of die head 24 radially out of cutting position and releasing them from all contact with the workpiece 26. The die head 24 is still rotating in the same direction and the quill 20 and its operating rod 52 are still advancing so that after a further fractional turn of the die head 24 to allow the die head time to move its cutting members out of contact with the workpiece, the rod 52 will shift another limit switch controlling the solenoid of valve unit 42 to supply pressure to the underside of the piston in hydraulic unit 40 thus rapidly retracting the quill 20 and die head 24 to the start position.

This upward movement will disengage the cone clutch 38 from the clutch face 36 and even though the spindle 16 is still being turned the lead screw 34 will no longer be turning or advancing. To retract or unscrew the lead screw, the upward retraction of the operating rod 52 will shift another limit switch to energize the solenoid of valve unit 62 thus starting motor 58 which will cause the reverse rotation of the lead screw until it is fully retracted. The abutment of the plug 56 is utilized to stop the motor 58 by any conventional means. Any switching mechanism can be employed to automatically de-energize motor 12 and permit change of the workpiece. However, the parts are now in the starting position as shown in the drawings.

While this description has been directed to a vertically positioned spindle with upward and downward reciprocation, the machine can be placed with the spindle horizontal and downward motion will then be termed advance and upward motion termed retraction.

I claim:
1. A metal working machine comprising:
   a. a non-reversible motor driven spindle mounted for axial and rotative movements the axis of said motor being offset laterally from the axis of said spindle;
   b. a hydraulic cylinder and piston unit mounted laterally of said motor between said motor and said spindle for advancing and retracting said spindle in its axial movement including a quill to which said unit is directly connected and with which said spindle is rotatively engaged;
   c. an expandable and contractible cutting tool carried by said spindle; and
   d. another hydraulic cylinder and piston for effecting the expansion and contraction of said cutting tool directly connected to said quill.

2. A metal working machine as defined in claim 1 wherein:
   a. there is a lead screw continuously engaged with a lead screw nut for controlling the axial advance of said spindle while in engagement with a workpiece; and b. a separate fluid motor for rapidly unscrewing said lead screw as said spindle is being retracted.

* * * * *